United States Patent
Iso

(10) Patent No.: US 12,479,368 B2
(45) Date of Patent: Nov. 25, 2025

(54) STORAGE DEVICE FOR VEHICLE

(71) Applicant: MORIROKU TECHNOLOGY COMPANY, LTD., Tokyo (JP)

(72) Inventor: Suzuka Iso, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 384 days.

(21) Appl. No.: 18/331,421

(22) Filed: Jun. 8, 2023

(65) Prior Publication Data

US 2023/0398943 A1 Dec. 14, 2023

(30) Foreign Application Priority Data

Jun. 10, 2022 (JP) ................................ 2022-094085
Jan. 30, 2023 (JP) ................................ 2023-011597

(51) Int. Cl.
*B60R 7/04* (2006.01)
*B60R 7/06* (2006.01)

(52) U.S. Cl.
CPC . *B60R 7/04* (2013.01); *B60R 7/06* (2013.01)

(58) Field of Classification Search
CPC .............. B60R 7/04; B60R 7/046; B60R 7/06
USPC ....................... 296/37.8, 37.12, 37.13, 37.15
See application file for complete search history.

(56) References Cited

U.S. PATENT DOCUMENTS

| | | | | |
|---|---|---|---|---|
| 7,328,825 B2 * | 2/2008 | Kaiser | ..................... | B60R 11/00 |
| | | | | 224/543 |
| 8,925,616 B2 * | 1/2015 | Ganz | ..................... | B60N 2/793 |
| | | | | 160/231.2 |
| 9,180,806 B2 * | 11/2015 | Schreiber | ............... | B60N 3/108 |
| 9,238,440 B1 * | 1/2016 | Bowser | .................. | B60J 5/0413 |
| 10,730,442 B2 * | 8/2020 | Kim | ...................... | B60N 3/102 |
| 11,577,657 B2 * | 2/2023 | Lee | ............................ | B60R 7/04 |
| 12,280,701 B2 * | 4/2025 | Harmon | ................. | B60N 3/002 |
| 2005/0252940 A1 * | 11/2005 | Brandstetter | ........... | B60R 7/046 |
| | | | | 224/543 |
| 2009/0108609 A1 * | 4/2009 | Hirai | ........................ | B60R 7/04 |
| | | | | 296/37.16 |
| 2009/0189404 A1 * | 7/2009 | Anderson | ................. | B60R 7/02 |
| | | | | 296/37.6 |
| 2015/0183377 A1 * | 7/2015 | Ruffner | .................. | B60N 3/101 |
| | | | | 296/37.8 |
| 2020/0130587 A1 * | 4/2020 | Cho | .......................... | B60R 5/04 |
| 2020/0324705 A1 * | 10/2020 | Lee | ......................... | B60R 5/044 |

(Continued)

FOREIGN PATENT DOCUMENTS

JP S61-90458 U 6/1986
JP H7-236592 A 9/1995

(Continued)

*Primary Examiner* — Jason S Morrow
(74) *Attorney, Agent, or Firm* — Rankin, Hill & Clark LLP

(57) ABSTRACT

A storage body of a storage structure for vehicle includes a box that is open on one surface, and an opening and closing member by which the open surface of the box is openable and closable. The box has an extraction hole through which an object stored in the box is extractable. The extraction hole is located in a surface different from the open surface of the box. The storage body is swingably attached to a recess of an instrument panel. When the storage body is in a storage position, the opening and closing member faces a passenger compartment. When the storage body is in a swing position, the opening and closing member and the extraction hole face the passenger compartment.

16 Claims, 9 Drawing Sheets

(56) References Cited

U.S. PATENT DOCUMENTS

| | | | | |
|---|---|---|---|---|
| 2024/0116453 A1* | 4/2024 | Kuwano | ............ | B65D 83/0805 |
| 2025/0058687 A1* | 2/2025 | Seo | ........................ | B60N 2/757 |

FOREIGN PATENT DOCUMENTS

| | | | |
|---|---|---|---|
| JP | 2011-88591 A | 5/2011 |
| JP | 2011-148351 A | 8/2011 |
| JP | 2014-125043 A | 7/2014 |
| JP | 2014-188358 A | 10/2014 |

* cited by examiner

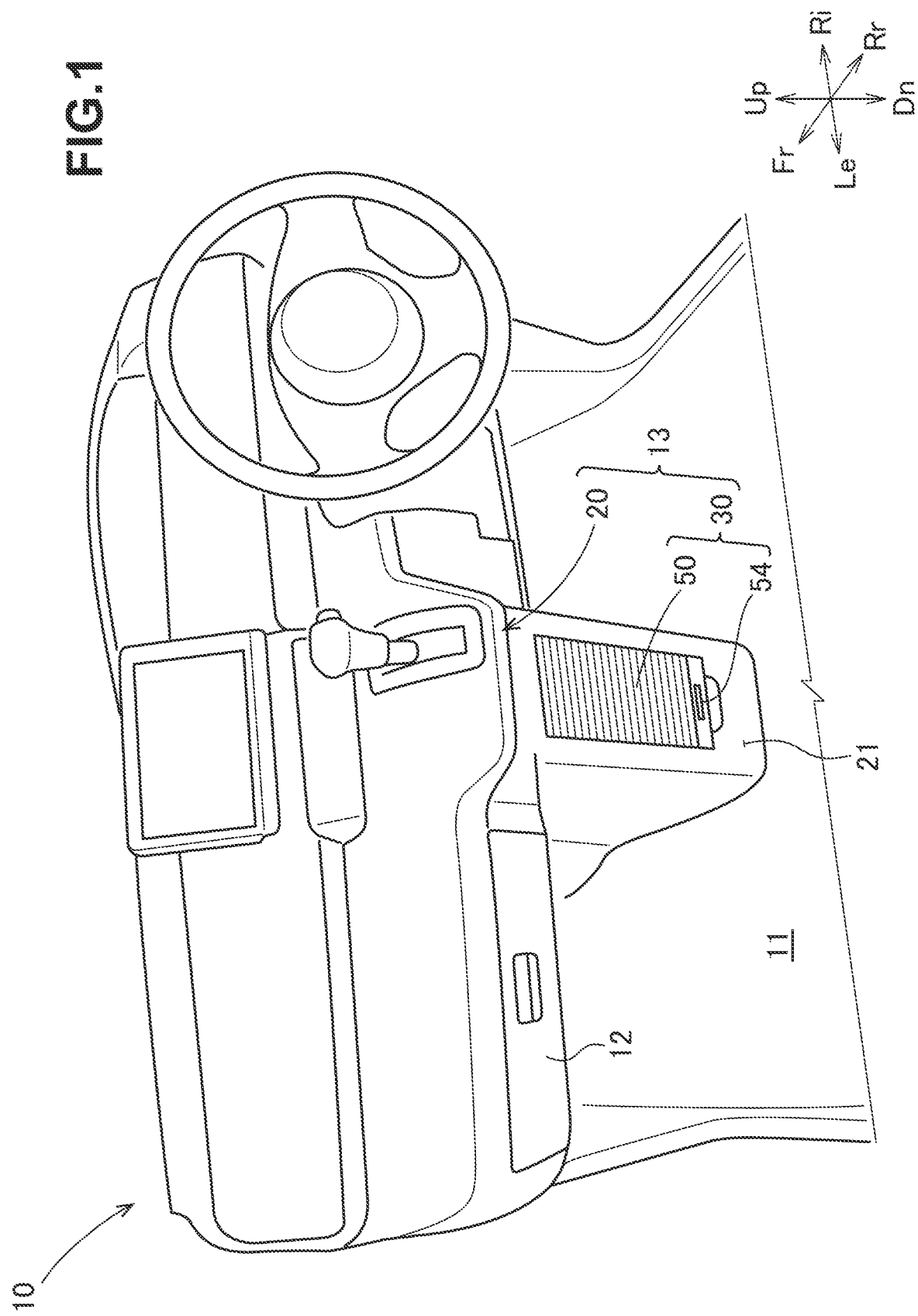

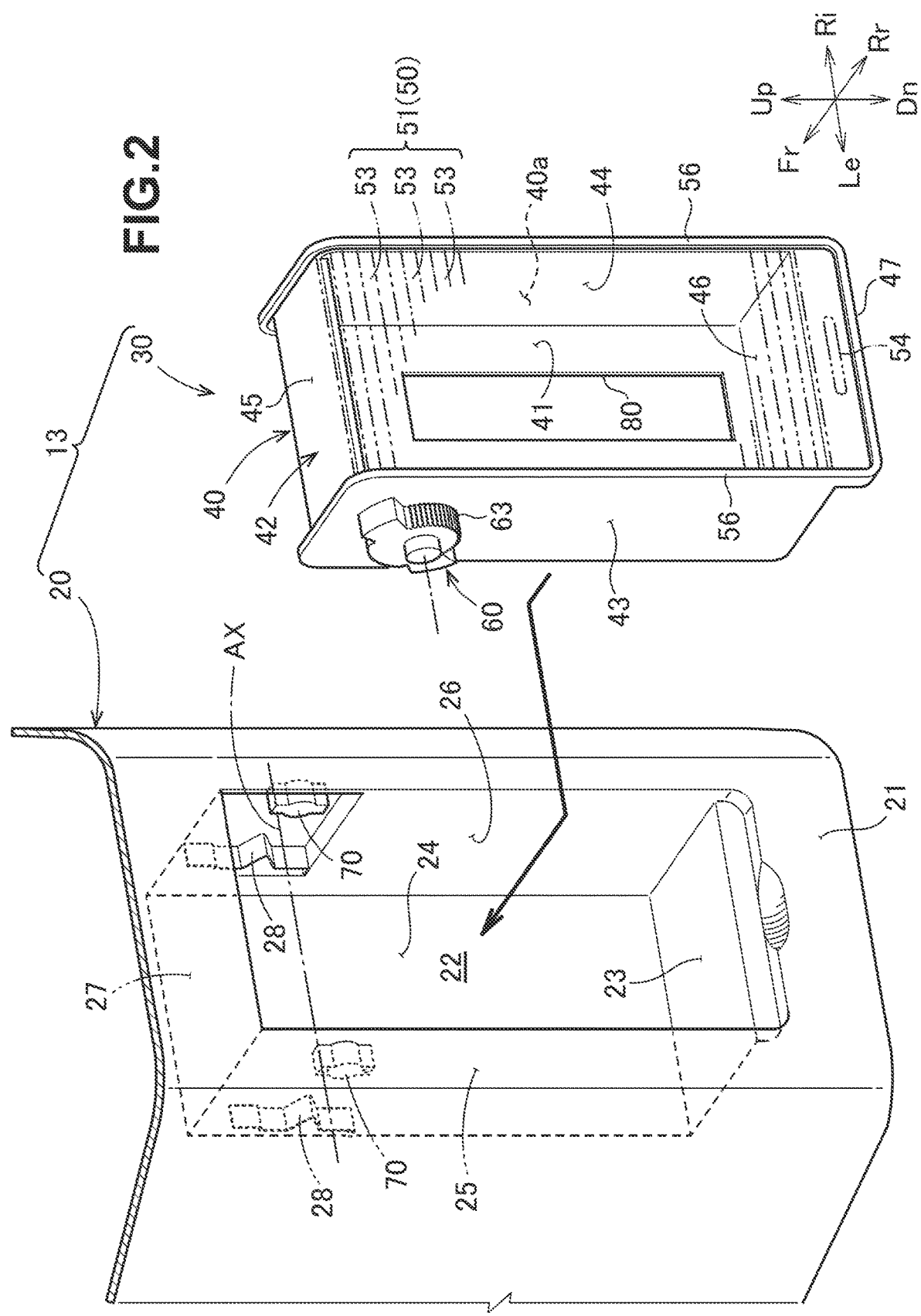

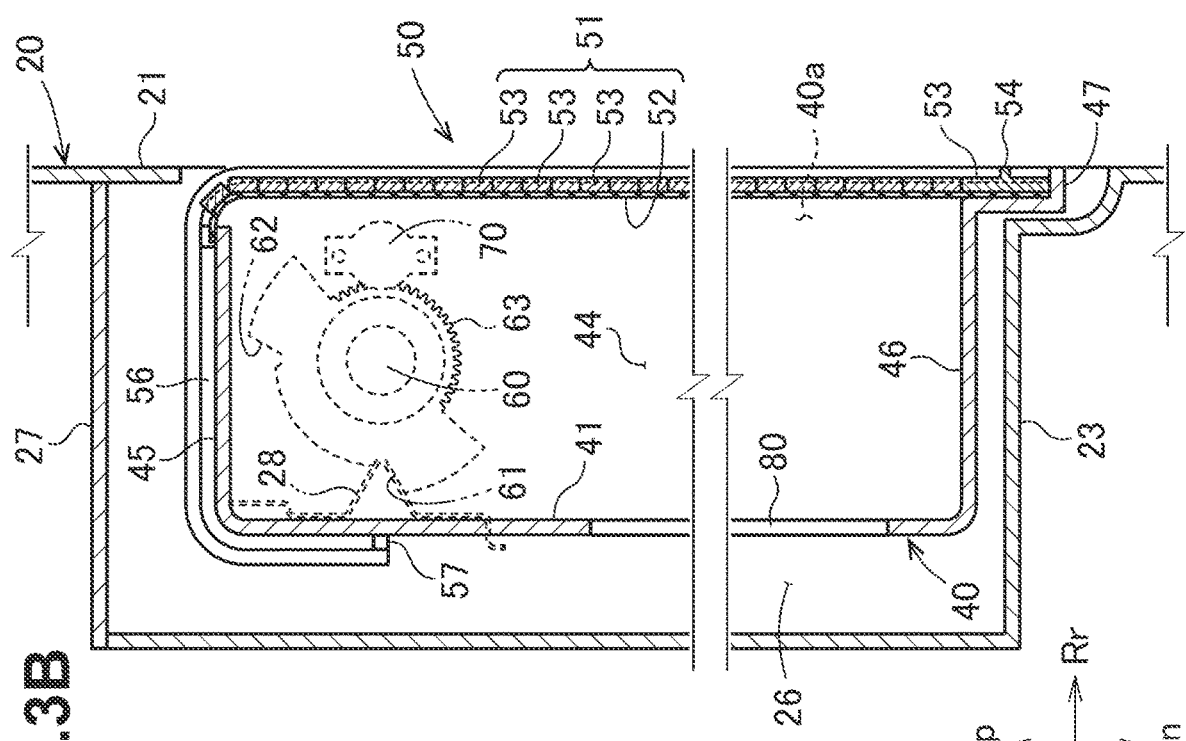
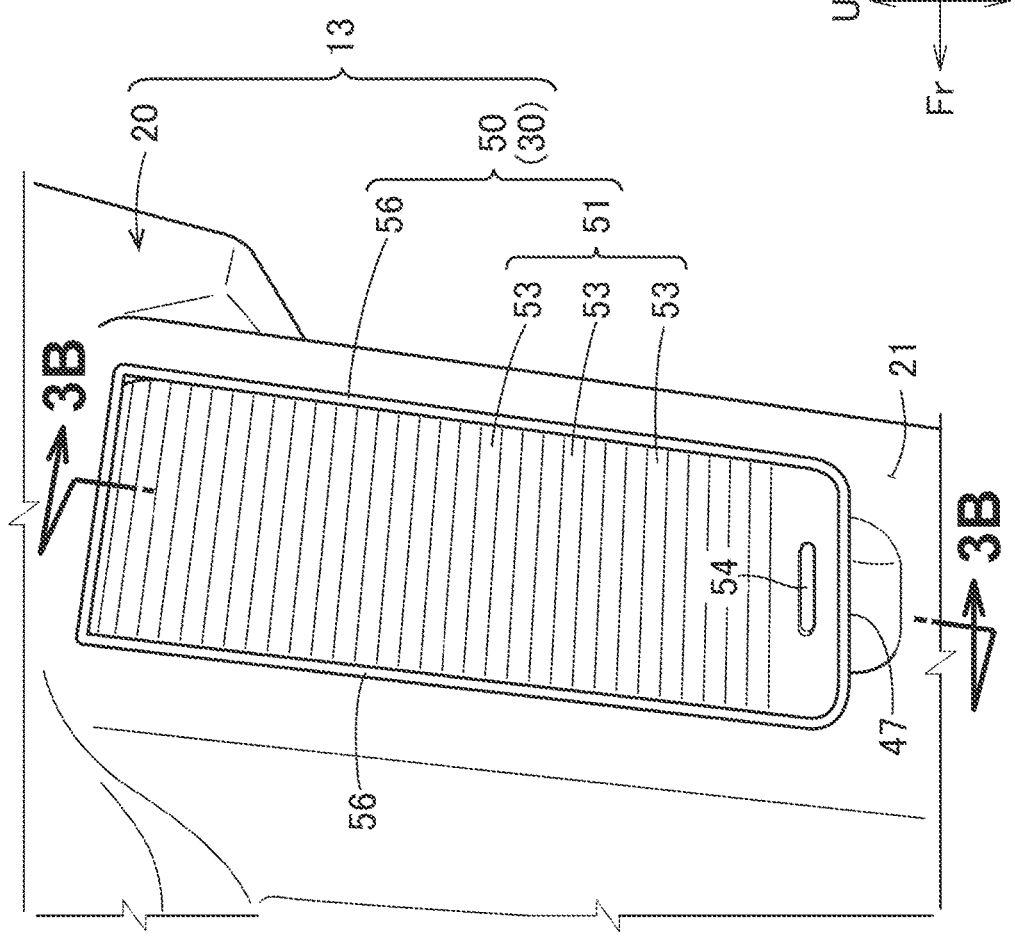

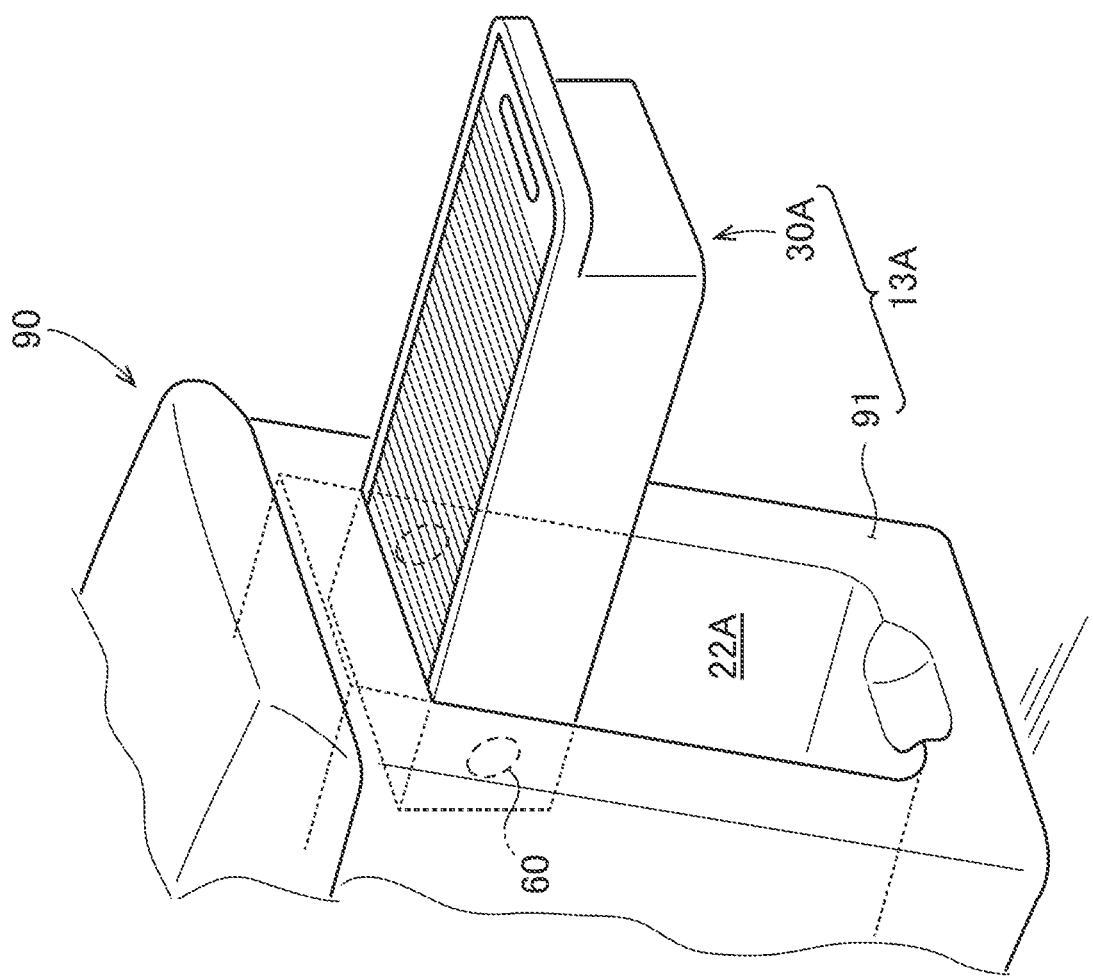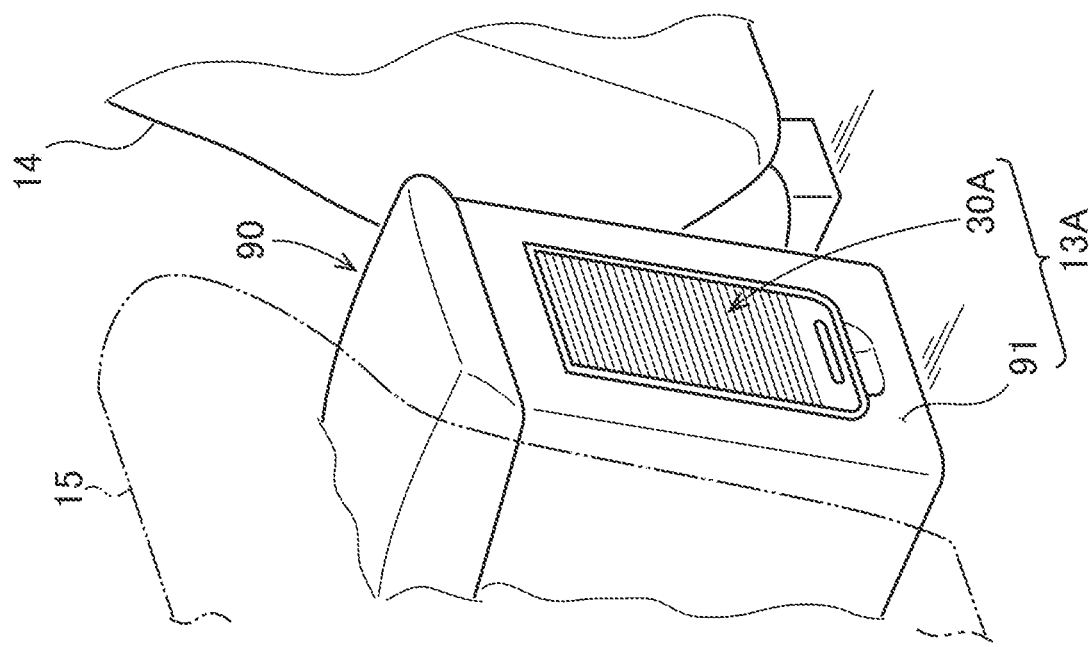

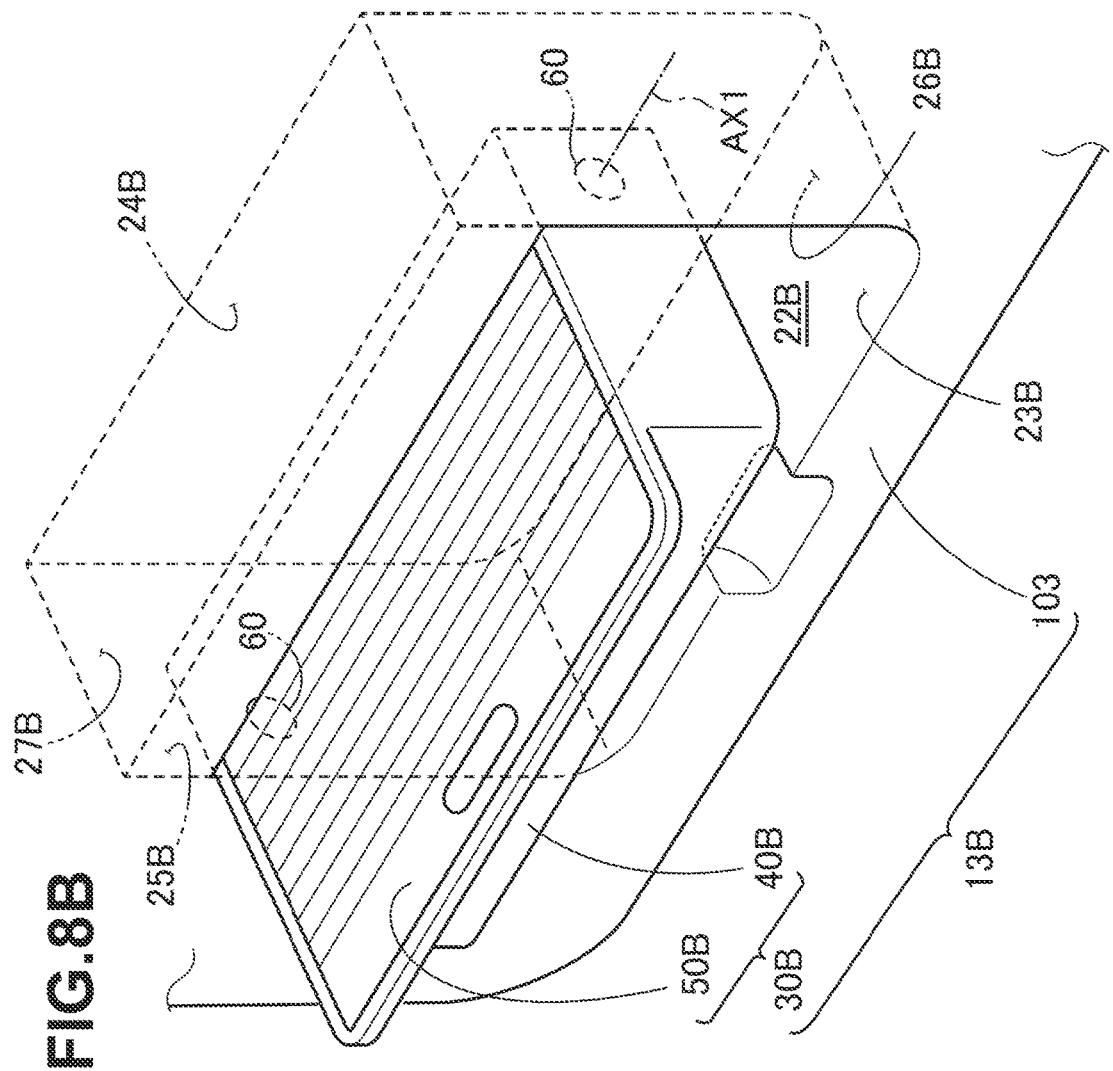
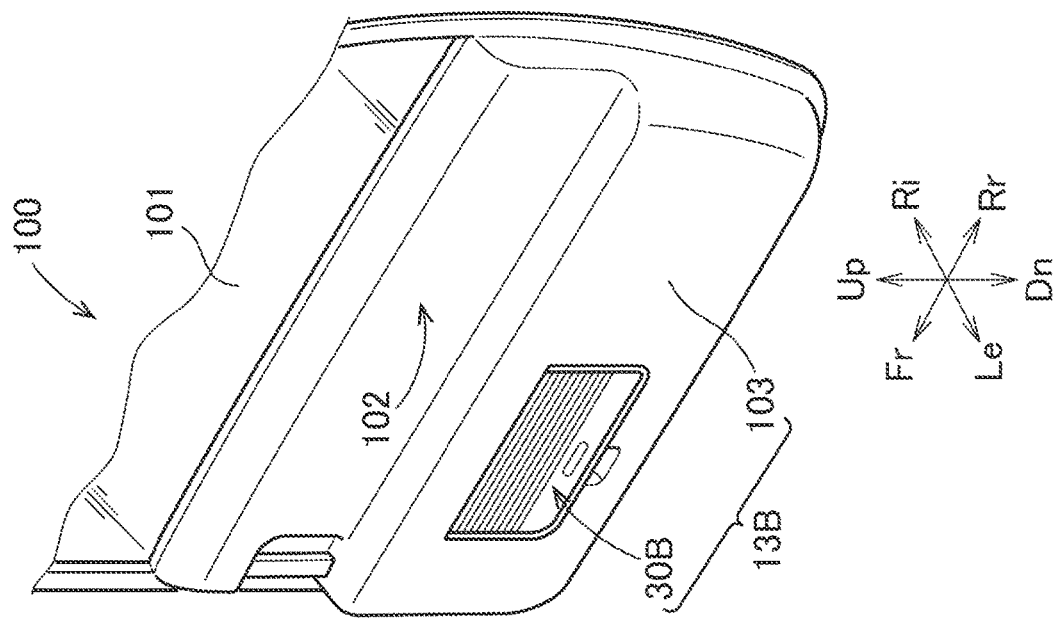

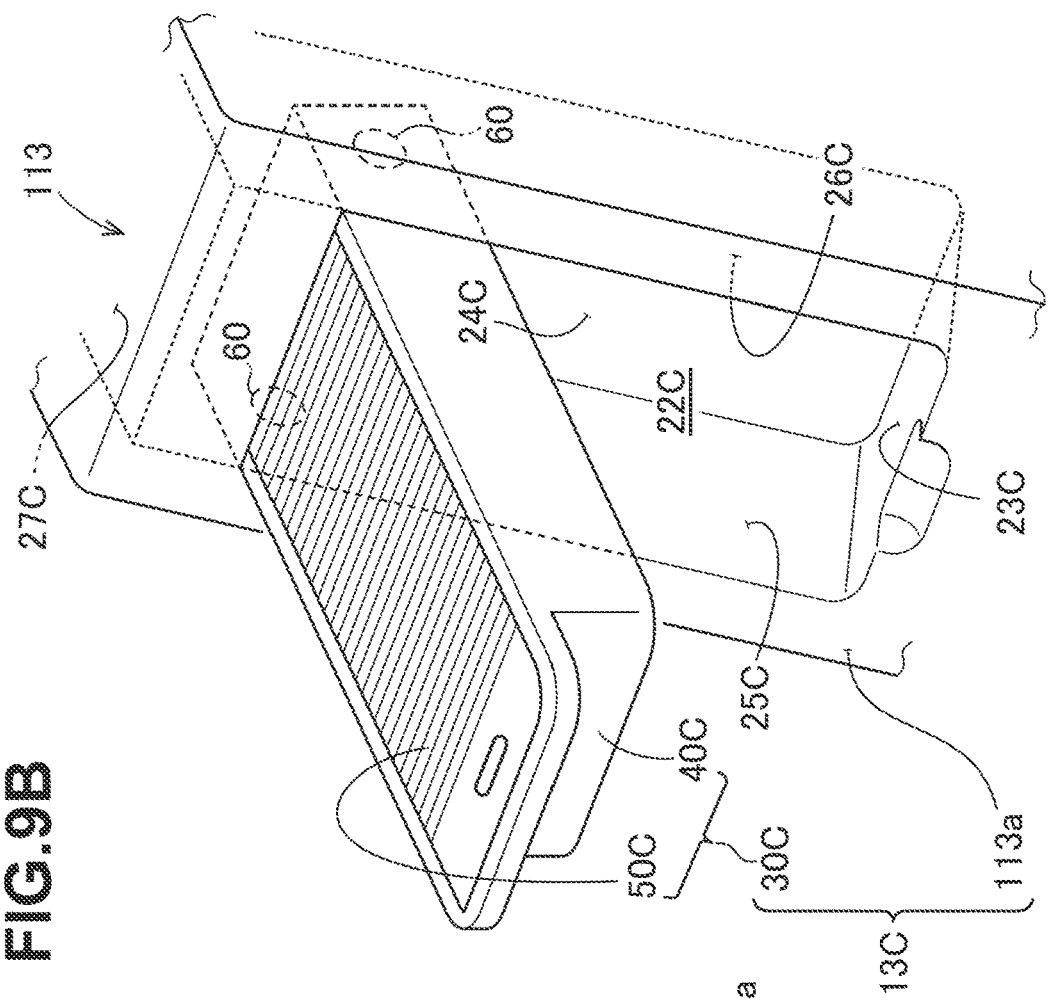
FIG.9B
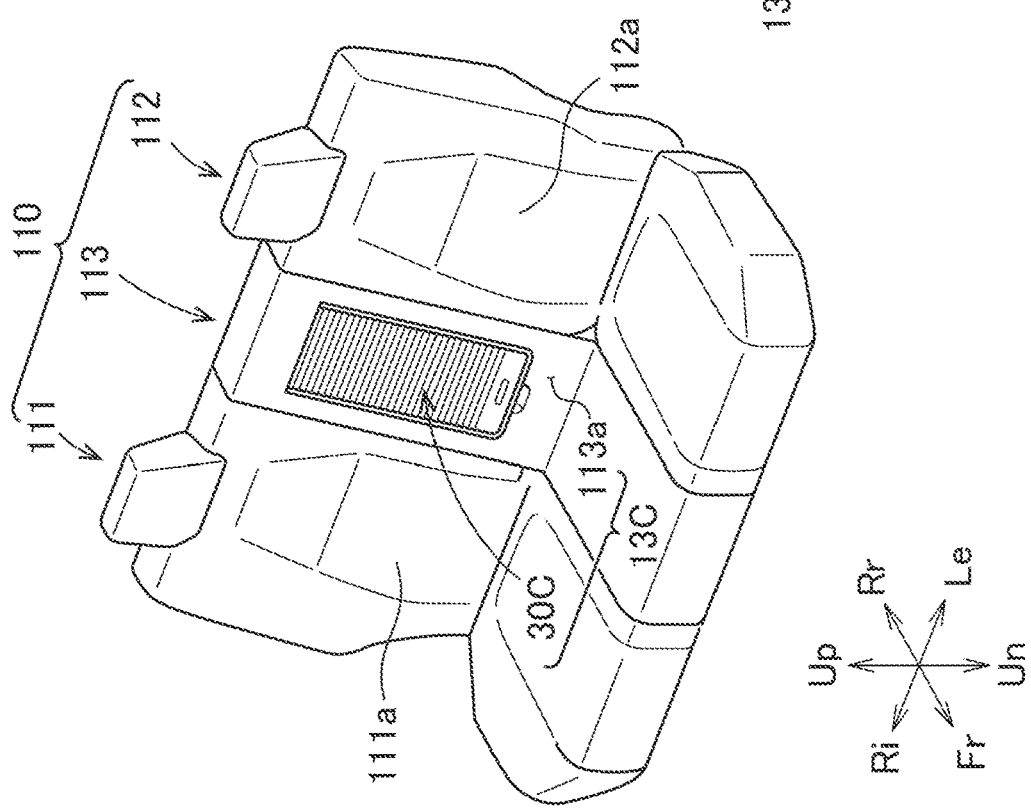
FIG.9A
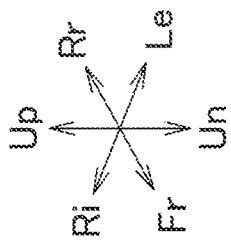

STORAGE DEVICE FOR VEHICLE

FIELD OF THE INVENTION

The present invention relates to a storage structure for vehicle including a swingable storage body.

BACKGROUND

An instrument panel is provided in a vehicle width direction in front of a driver's seat and a passenger's seat of a vehicle such as a passenger car. A prior art relating to a storage structure for vehicle which is provided in the instrument panel and in which an object is storable is disclosed in Japanese Unexamined Patent Publication No. 2014-125043.

The storage structure for vehicle disclosed in Japanese Unexamined Patent Publication No. 2014-125043 includes a recess formed in the instrument panel, and a storage body that is storable in the recess. The storage body includes a box that is open on one surface, and a pair of pins extending outward from the box in the vehicle width direction. The recess has support holes supporting the pair of pins of the storage body. The storage body is swingably (rotatably) attached to the recess.

When an occupant pulls the storage body toward herself or himself, the storage body stored in the recess swings around the pair of pins as the center, an opening of the box of the storage body appears, and the occupant can extract the object. There is room for improvement in the usability of such a swingable storage body.

An object of the invention is to provide a storage structure for vehicle that allows for various ways of taking an object in and out and that provides good usability.

SUMMARY

According to a first aspect of the invention, there is provided a storage structure for vehicle including: a storage body that is storable in a recess in a passenger compartment. The storage body includes a box that is open on one surface, and an opening and closing member by which the open surface of the box is openable and closable. The box has an extraction hole through which an object stored in the box is extractable, and the extraction hole is located in a surface different from the open surface of the box. The storage body is swingably attached to the recess, so that the storage body is allowed to be in a storage position where the storage body is stored in the recess and in a swing position that is a position where the storage body is swung from the storage position. When the storage body is in the storage position, the opening and closing member faces the passenger compartment. When the storage body is in the swing position, the opening and closing member and the extraction hole face the passenger compartment.

According to a second aspect of the invention, preferably, in the storage structure for vehicle according to the first aspect, the storage body in the storage position is swingable upward.

According to a third aspect of the invention, preferably, in the storage structure for vehicle according to the first or second aspect, the storage body is located at substantially a center in a vehicle width direction.

According to a fourth aspect of the invention, preferably, the storage structure for vehicle according to any one of the first to third aspects further includes a holding mechanism by which the storage body in the swing position is heldable.

According to a fifth aspect of the invention, preferably, in the storage structure for vehicle according to any one of the first to fourth aspects, the swing position includes a horizontal position where the opening and closing member becomes substantially horizontal.

According to a sixth aspect of the invention, preferably, in the storage structure for vehicle according to any one of the first to fifth aspects, the opening and closing member is a shutter, and a direction from top to bottom with respect to when the storage body is in the storage position is a direction in which the shutter is closed.

According to a seventh aspect, preferably, in the storage structure for vehicle according to any one of the first to sixth aspects, the extraction hole is located opposite the opening and closing member, and the box is formed to fit an external shape of a tissue box.

According to an eighth aspect of the invention, preferably, the storage structure for vehicle according to any one of the first to seventh aspects further includes a plate-shaped member by which the extraction hole is closable is provided, and the plate-shaped member is attachable and detachable from the extraction hole.

According to a ninth aspect of the invention, preferably, in the storage structure for vehicle according to any one of the first to eighth aspects, the recess is formed in an instrument panel.

According to a tenth aspect of the invention, preferably, in the storage structure for vehicle according to any one of the first to eighth aspects, the recess is formed in a rear surface of a center console.

According to an eleventh aspect of the invention, preferably, in the storage structure for vehicle according to any one of the first, the second, and the fourth to eighth aspects, the recess is formed in a door trim.

According to a twelfth aspect of the invention, preferably, in the storage structure for vehicle according to any one of the first to eighth aspects, a rear-row seat in which a plurality of occupants are seatable side by side in a vehicle width direction is provided behind a driver's seat and a passenger's seat. The rear-row seat includes a first backrest portion and a second backrest portion arranged in the vehicle width direction, and an intermediate portion located between the first backrest portion and the second backrest portion. The recess is formed in a front surface of the intermediate portion.

A storage body in which an object is storable is storable in a recess of a passenger compartment. The storage body includes a box that is open on one surface, and an opening and closing member by which the open surface of the box is openable and closable. The box includes an extraction hole through which the object stored in the box is extractable. The storage body is swingably (rotatably) attached to the recess, and is allowed to be located in a storage position and in a swing position.

When the storage body is in the storage position, the opening and closing member faces the passenger compartment. When the storage body is in the swing position, the opening and closing member faces the passenger compartment, and the extraction hole faces the passenger compartment. Regardless of whether the storage body is in the storage position or the swing position, the opening and closing member is openable and closable.

Therefore, when the storage body is in the storage position, an occupant can open the opening and closing member and access the inside of the box from the open surface of the box. Further, when the storage body is in the swing position, the occupant can access the inside of the box from the open surface of the box or from the extraction hole. Regardless of the position of the storage body, the inside of the box is accessible in the above manner. The storage structure for vehicle allows for various ways of taking the stored object in and out, and provides good usability.

BRIEF DESCRIPTION OF THE DRAWINGS

FIG. 1 is a view describing a passenger compartment of a vehicle that employs a storage structure for vehicle according to a first embodiment;

FIG. 2 is a view describing a recess and a storage body constituting the storage structure for vehicle;

FIG. 3A is a view describing the storage body in a storage position and FIG. 3B is a cross-sectional view taken along line 3B-3B in FIG. 3A;

FIG. 7A is a perspective view of a storage structure for vehicle according to a second embodiment and FIG. 7B is a view describing the storage structure for vehicle in which a storage body illustrated in FIG. 7A is in a swing position;

FIG. 8A is a perspective view of a storage structure for vehicle according to a third embodiment and FIG. 8B is a view describing the storage structure for vehicle in which a storage body illustrated in FIG. 8A is in a swing position; and FIG. 9A is a perspective view of a storage structure for vehicle according to a fourth embodiment and FIG. 9B is a view describing the storage structure for vehicle in which a storage body illustrated in FIG. 9A is in a swing position.

DETAILED DESCRIPTION OF THE PREFERRED EMBODIMENTS

Figure 4A:
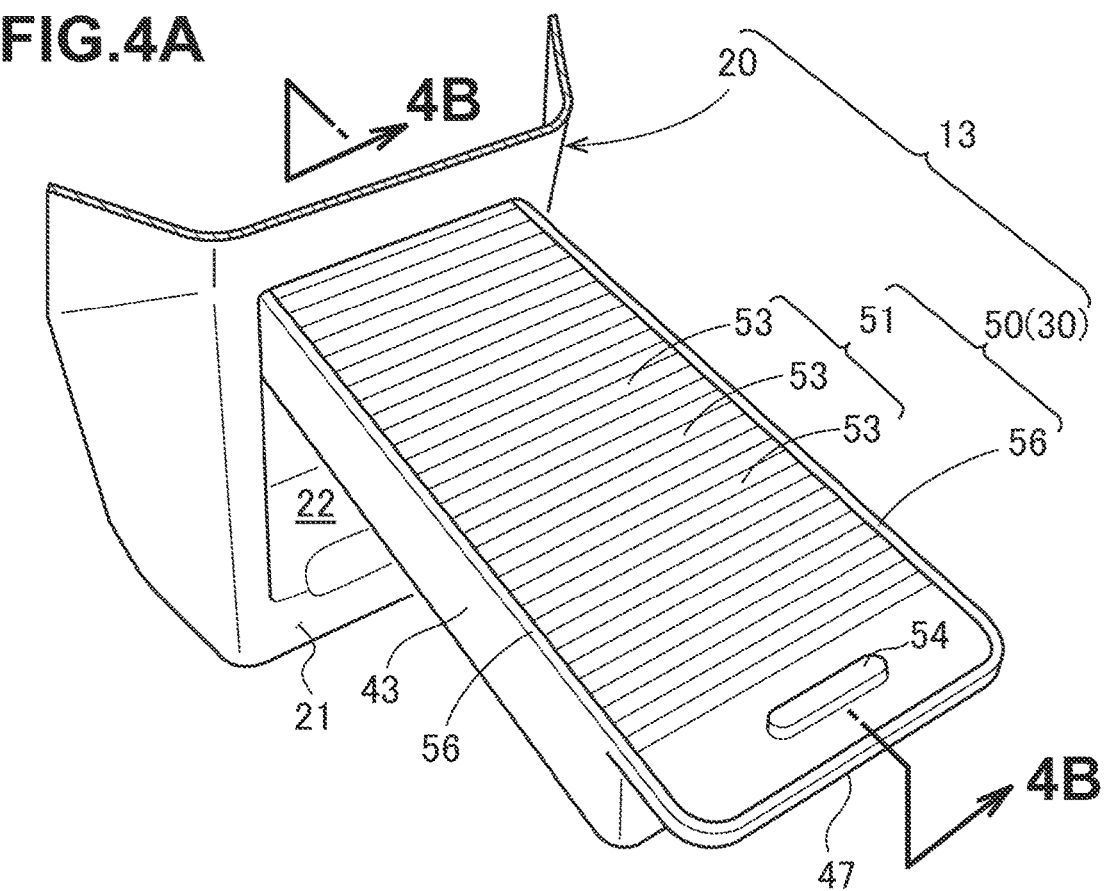
FIG. 4A is a view describing the storage body in a swing position and FIG. 4B is a cross-sectional view taken along line 4B-4B in FIG. 4A.

Embodiments will be described with reference to the drawings. Incidentally, left-right indicates left-right with reference to an occupant of a vehicle (vehicle width direction), and front-rear indicates front-rear with reference to a traveling direction of the vehicle. In addition, in the drawings, Fr represents the front, Rr represents the rear, L represents the left when viewed from the occupant, R represents the right when viewed from the occupant, Up represents the top or up, and Dn represents the bottom or down.

First Embodiment

FIG. 1 illustrates a passenger compartment 11 of a vehicle 10 (for example, four-wheeled compact car). The passenger compartment 11 is provided with a driver's seat and a passenger's seat (not illustrated) disposed in the vehicle width direction, and an instrument panel 20 located in front of the driver's seat and the passenger's seat. The instrument panel 20 includes a glove box 12 located in front of the passenger's seat, and a storage structure for vehicle 13 according to the embodiment.

Referring to FIG. 2, the instrument panel 20 has a rear surface 21 located at the center of a vehicle width and facing rearward (including slightly obliquely upward and obliquely downward). The rear surface 21 has a rectangular shape with an up-down direction as a longitudinal direction. The storage structure for vehicle 13 includes a recess 22 formed in the rear surface 21 of the instrument panel 20, and a storage body 30 having a substantially block shape, which is storable in the recess 22.

The recess 22 is a block-shaped space which is open toward the rear and of which the longitudinal direction becomes a vehicle height direction (up-down direction). The recess 22 includes a bottom portion 23 facing upward; a back wall 24 extending upward from a back edge of the bottom portion 23; a pair of lateral walls 25 and 26 extending upward from edges in the vehicle width direction of the bottom portion 23; and a top plate portion 27 facing the bottom portion 23.

The storage body 30 includes a box 40 which is open on one surface 40a and in which an object is storable, and a shutter 50 (opening and closing member) by which the open surface 40a of the box 40 is openable and closable. The box 40 is configured such that a base portion 41 having a rectangular plate shape and located opposite the open surface 40a and a peripheral wall 42 extending from a peripheral edge of the base portion 41 to the open surface 40a are integrated.

The peripheral wall 42 includes a pair of long walls 43 and 44 extending in the longitudinal direction, and a pair of short walls 45 and 46 extending in a lateral direction. Of the pair of long walls 43 and 44, the long wall located on a passenger's seat side is referred to as the left wall 43, and the long wall located on a driver's seat side is referred to as the right wall 44. Of the pair of short walls 45 and 46, the short wall closer to an axis AX to be described later is referred to as the first wall 45, and the short wall farther from the axis AX is referred to as the second wall 46.

The shutter 50 includes a slat 51 that can cover the open surface 40a, and a pair of rails 56 and 56 that slidably support both ends of the slat 51.

The slat 51 includes a plate 52 having a sheet shape and a plurality of long plates 53 fixed to the plate 52. The long plates 53 are plate-shaped members with the vehicle width direction as the longitudinal direction, and are connected to each other in a bellows shape. Among the plurality of long plates 53, the long plate 53 located on a side on which the slat 51 is opened (lower side) is provided with an opening and closing grip portion 54 that can be gripped by the occupant. The open surface 40a of the box is openable and closable by griping the opening and closing grip portion 54 and sliding the slat 51 along the rails 56 and 56. Incidentally, the shutter 50 can also hold the slat 51 of the shutter 50 using a lock mechanism (not illustrated) of known technology around the opening and closing grip portion 54.

The left rail 56 is provided from the first wall 45 to the base portion 41 along an opening-side edge of the left wall 43. The right rail 56 is provided from the first wall 45 to the base portion 41 along an opening-side edge of the right wall 44.

Magnets 57 are provided at end portions on a back side (direction in which the slat 51 is closed) of the left and right rails 56 and 56. The magnets are attracted to clips (not illustrated) fixed to the long plate 53 on the back side of the rails 56 and 56 by magnetic force. When the magnets and the clips are fixed to each other, the open state of the open surface 40a of the box 40 is maintained.

Incidentally, the storage body 30 swings as will be described below, to change its position; however, the shutter 50 is openable and closable regardless of the position of the storage body 30.

In addition, it is preferable that a direction away from a shaft portion 60 to be described later with reference to a radial direction of the shaft portion 60 is set to the direction in which the slat 51 of the shutter 50 is closed. Namely, a direction from top to bottom (direction in which gravity acts) with reference to when the storage body 30 is in a storage position to be described later is the direction in which the slat 51 of the shutter 50 is closed. The lock mechanism can be prevented from being released against the intention of the occupant. When the lock mechanism is not used, the closed state of the slat 51 can be maintained without increasing the number of components.

Referring to FIG. 2, FIG. 3A, and FIG. 3B, the storage body 30 is swingably (rotatably) attached to the recess 22 of the instrument panel 20. The axis AX which is the center of swing extends in the vehicle width direction. The second wall 46 includes a swing grip portion 47 that the occupant can grip when swinging the storage body 30.

The storage body 30 is located in the storage position where the storage body 30 is stored in the recess 22 of the instrument panel 20. When the storage body 30 is in the storage position, the slat 51 of the shutter 50 faces the passenger compartment 11. The rear surface 21 of the instrument panel 20 and the slat 51 of the shutter 50 are located on substantially the same plane (in other words, are flush with each other). Namely, the slat 51 faces substantially rearward.

The lateral walls 25 and 26 of the recess 22 include support portions (not illustrated) that swingably support the storage body 30, and restriction members 28 and 28 that can restrict the swing range of the storage body 30.

The left wall 43 and the right wall 44 of the box 40 include the shaft portions 60 and 60 (only the shaft portion 60 on the left side is illustrated in FIG. 2) rotatably supported by the support portions of the recess 22. The shaft portions 60 and 60 have storage contact surfaces 61 that can come into surface contact with the restriction members 28 and 28 when the storage body 30 is in the storage position.

Figure 4B:
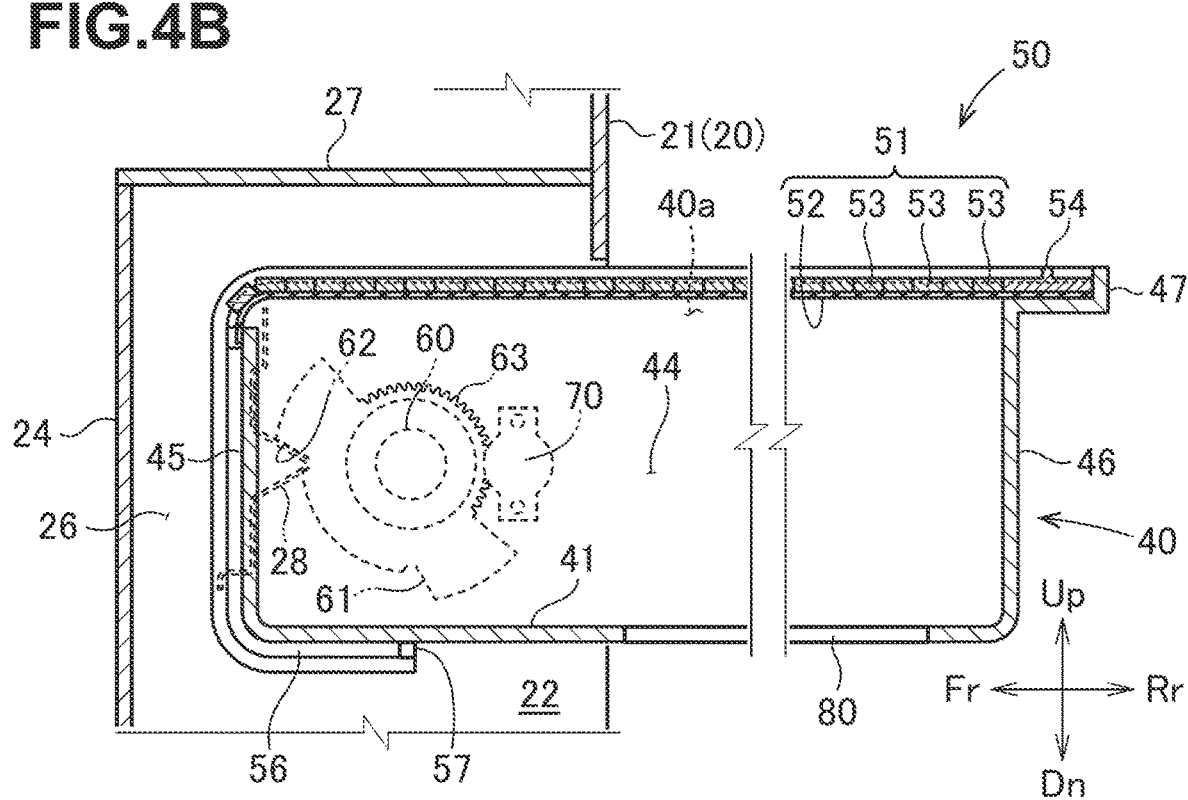

Referring to FIG. 4A and FIG. 4B, the storage body 30 is in the swing position where the storage body 30 swings away from the recess 22 from the storage position. When the storage body 30 is in the swing position, the slat 51 of the shutter 50 faces the passenger compartment 11.

The range in which the storage body 30 is swingable can be set as appropriate. For example, in the embodiment, the swing position includes a horizontal position where the slat 51 of the shutter 50 becomes substantially horizontal (position parallel to a floor surface of the vehicle 10). It can also be said that the horizontal position is a position where the open surface 40a of the box 40 or an outer surface of the slat 51 faces vertically upward. When the storage body 30 is in the horizontal position, the longitudinal direction of the storage body 30 becomes a vehicle front-rear direction.

The shaft portions 60 have horizontal contact surfaces 62 that can come into surface contact with the restriction members 28 when the storage body 30 is in the horizontal position.

Referring to FIG. 2 and FIG. 4B, each shaft portion 60 includes a spur gear portion 63 in which a part of an outer periphery is formed in a spur gear shape. The lateral walls 25 and 26 of the recess 22 include holding mechanisms 70 and 70 which can mesh with the spur gear portions 63 of the shaft portions 60 and 60 and by which the storage body 30 in the swing position is heldable (mechanisms that apply a force against torque caused by the weight of the storage body 30, to the spur gear portions 63). A well-known technique can be employed for the holding mechanism 70, and detailed description thereof will be omitted.

The box 40 includes an extraction hole 80 through which the object stored in the box 40 is extractable. The extraction hole 80 is located in the base portion 41 of the box 40 (on a side opposite the opening and closing member); however, for example, the extraction holes 80 may be formed in the long walls 43 and 44. The extraction hole 80 has a long hole shape extending in the longitudinal direction of the long walls 43 and 44 of the box 40. The number or shape of the extraction holes 80 can be changed as appropriate.

When the storage body 30 is in the swing position, the extraction hole 80 faces the passenger compartment 11 (FIG. 4A and FIG. 4B). When the storage body 30 is in the storage position (refer to FIG. 3A and FIG. 3B), the extraction hole 80 is located inside the recess 22, and cannot be visually recognized from the outside.

Figure 5A:
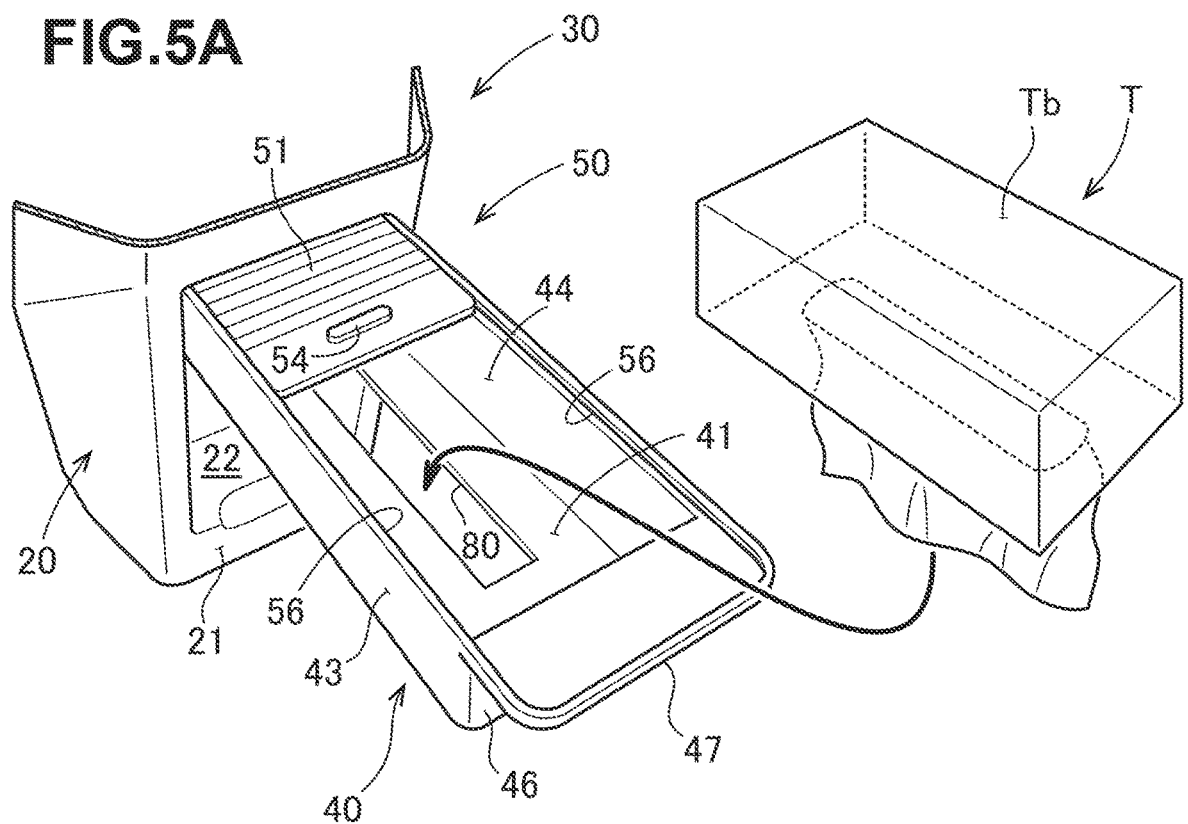
FIG. 5A is a view describing the way of storing a tissue box and FIG. 5B is a view describing the storage body in which the tissue box is stored.
Figure 5B:
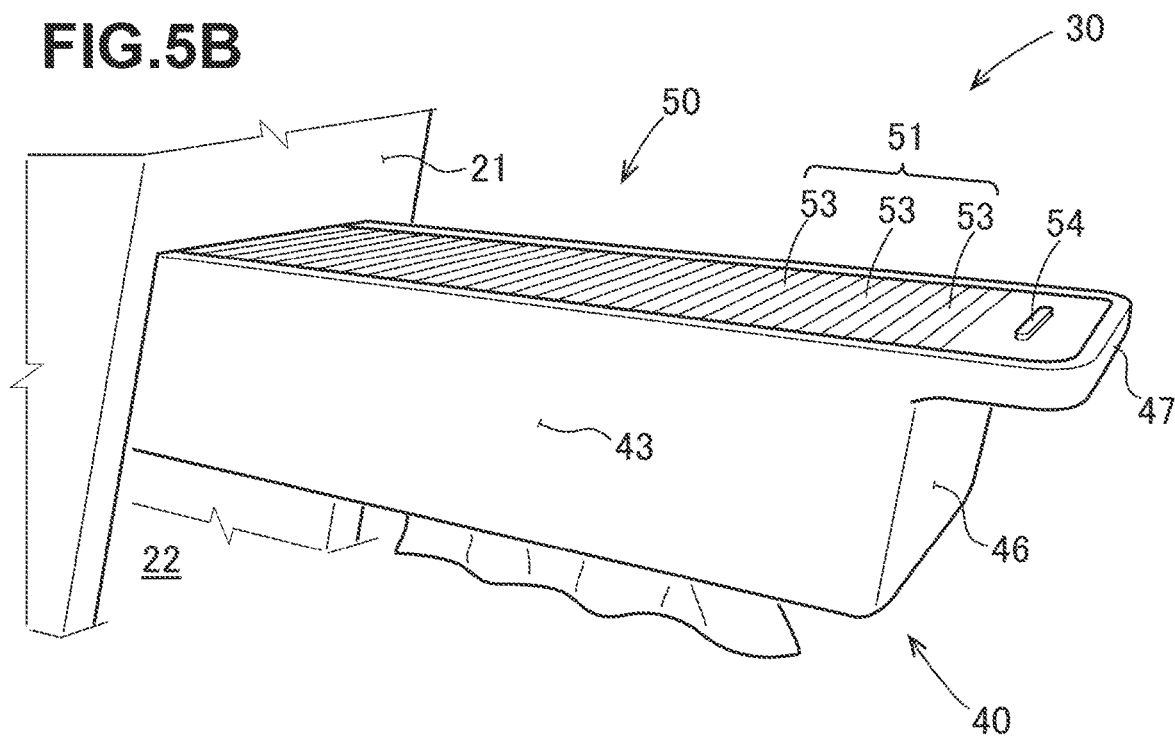

Referring to FIG. 5A and FIG. 5B, the box 40 is formed to fit the external shape of a tissue box. The position and the shape of the extraction hole 80 are set such that the tissues inside the tissue box are extractable.

Referring to FIG. 2, the storage body 30 in which an object is storable is storable in the recess 22 formed in the instrument panel 20. The storage body 30 includes the box 40 that is open on one surface 40a, and the shutter 50 (opening and closing member) by which the open surface 40a of the box 40 is openable and closable. The box 40 includes an extraction hole 80 through which the object stored in the box 40 is extractable.

The storage body 30 is swingably (rotatably) attached to the recess 22 of the instrument panel 20, and can be located in the storage position (refer to FIG. 3A and FIG. 3B) and in the swing position (refer to FIG. 4A and FIG. 4B).

When the storage body 30 is in the storage position, the slat 51 of the shutter 50 faces the passenger compartment 11. When the storage body 30 is in the swing position, the slat 51 of the shutter 50 faces the passenger compartment 11. Further, the extraction hole 80 faces the passenger compartment 11. Regardless of whether the storage body 30 is in the storage position or the swing position, the slat 51 of the shutter 50 is openable and closable.

Therefore, when the storage body 30 is in the storage position, the occupant can open the slat 51 of the shutter 50, access the inside of the box 40 from the open surface of the box 40, and take the object in and out. Further, when the storage body 30 is in the swing position, the occupant can access the inside of the box 40 from the open surface 40a of the box 40 or from the extraction hole 80. Regardless of the position of the storage body 30, the inside of the box 40 is accessible in the above manner. The storage structure for vehicle 13 allows for various ways of taking the stored object in and out, and provides good usability.

Referring to FIG. 4A and FIG. 4B, the storage body 30 in the storage position (refer to FIG. 3A) is swingable upward around the shaft portions 60. Namely, when the storage body 30 is swung from the storage position, the position of the storage body becomes higher and closer to the occupant, so that it becomes easy to take the object in and out. In addition, since the shaft portions 60 or portions around the shaft portions 60 are difficult for the occupant to see, the appearance is also good.

In addition, the storage body 30 is located at substantially the center in the vehicle width direction. For this reason, the storage body 30 is easily accessible from both the driver's seat and the passenger's seat. In addition, by disposing the storage body 30 vertically, namely, by disposing the storage body 30 such that the longitudinal direction of the storage body 30 in the storage position becomes the up-down direction, it is possible to secure a foot space.

The storage body 30 in the swing position is heldable in that position by the holding mechanisms 70 and 70. The occupant does not need to hold the storage body in the swing position, and can easily extract the object.

The swing position includes the horizontal position where the slat 51 of the shutter 50 becomes substantially horizontal. In the horizontal position, since the outer surface of the slat 51 faces vertically upward, an object can be placed on the outer surface of the slat 51. In addition, since the extraction hole 80 faces downward, the extraction hole 80 is also easily accessible.

Referring to FIG. 5A and FIG. 5B, the box 40 is formed to fit the external shape of a tissue box T. For this reason, the tissues inside the tissue box T are extractable from the extraction hole 80. Incidentally, regardless of the position of the storage body the tissue box T is storable or replaceable from the storage body 30.

In addition, the extraction hole 80 is located in the base portion 41 of the box 40 (on the side opposite the opening and closing member). Namely, the extraction hole faces vertically downward, and faces the floor surface of the vehicle. Even when the storage body 30 is in the swing position, the occupant cannot visually recognize the extraction hole 80 and the tissues. The design aesthetics of the passenger compartment 11 is not impaired. Further, even when the tissues inside the tissue box T becomes low in quantity, the tissues are easily extractable. In addition, since the extraction hole 80 faces downward, the tissue that comes out of the extraction hole 80 is less likely to get dusty and is hygienic.

Figure 6A:
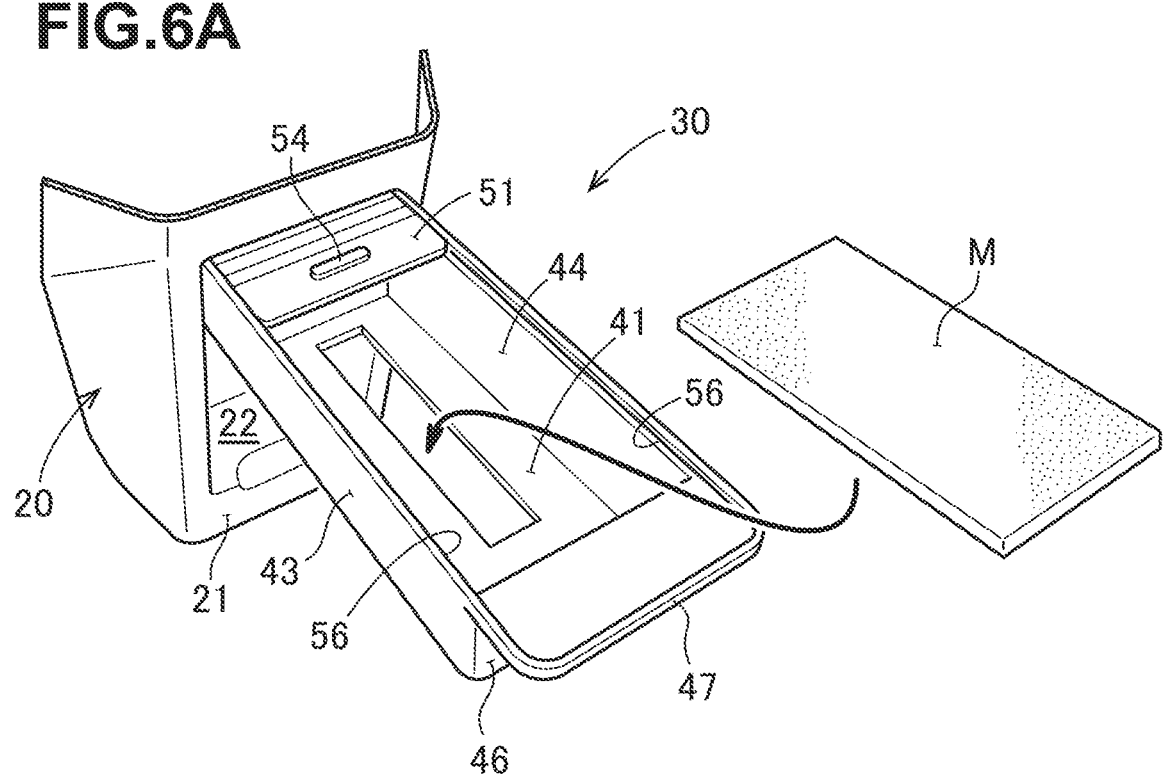
FIG. 6A is a view describing the way of attaching a plate-shaped member and FIG. 6B is a view describing the storage body to which the plate-shaped member is attached.
Figure 6B:
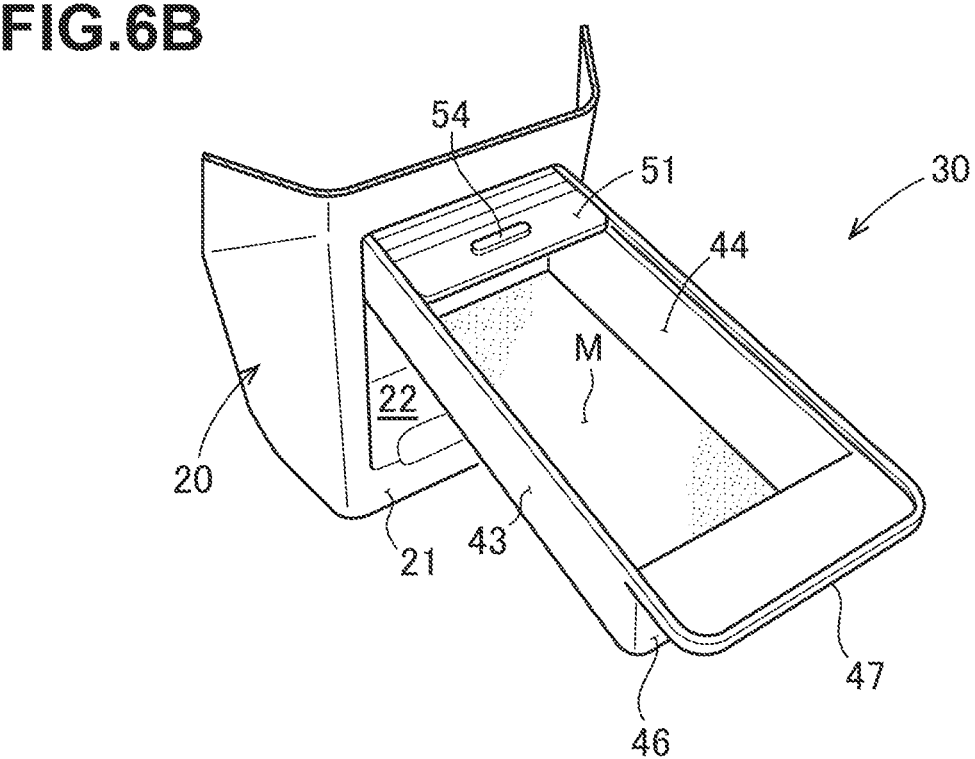

Referring to FIG. 6A and FIG. 6B, the extraction hole 80 is closable by a plate-shaped member M (for example, a rubber mat). The plate-shaped member M is attachable and detachable from the bottom portion 23 of the box 40, in which the extraction hole 80 is formed. The plate-shaped member M has a rectangular shape, and can be superimposed on the bottom portion 23 of the box 40. The size of the plate-shaped member M is set so as to cover the entirety of the bottom portion 23 of the box 40.

Incidentally, the plate-shaped member M can be superimposed on a back surface Tb (refer to FIG. 5A) of the tissue box T. The storage body 30 is set so as to be able to store both the tissue box T and the plate-shaped member M.

In the embodiment, the shutter 50 is employed as the opening and closing member. The opening and closing member may be a plate-shaped lid (not illustrated) that closes the open surface 40a of the box 40, instead of the shutter 50; however, the shutter 50 does not need to be removed from the box 40, and can open and close the open surface 40a simply by being swung.

The storage structure for vehicle is not limited to being provided in the instrument panel 20. The above effects of the invention are also exhibited in second to fourth embodiments to be described below. The same reference signs as in the first embodiment are assigned to configurations common to the first embodiment, and the descriptions thereof will be omitted.

Second Embodiment

Referring to FIG. 7A, a center console 90 is provided between a driver's seat 14 and a passenger's seat 15. The center console 90 has a rear surface 91 extending upward from a floor of the passenger compartment and facing a rear of the vehicle. A storage structure for vehicle 13A according to the second embodiment is provided in the rear surface 91 of the center console 90.

Referring to FIG. 7B, the storage structure for vehicle 13A includes a recess 22A formed in the rear surface 91 of the center console 90, and a storage body 30A having a substantially block shape, which is storable in the recess 22A. The basic configuration of the recess 22A is the same as that of the recess 22 of the first embodiment, and the basic configuration of the storage body 30A is the same as that of the storage body 30 of the first embodiment.

Third Embodiment

FIG. 8A illustrates a part of a sliding door 100 of a passenger car. The sliding door 100 includes a door trim 102 that is located below a window 101 and that is an interior of a passenger compartment. A lower portion 103 corresponding to a lower half of the door trim 102 bulges to the inside of the passenger compartment. A storage structure for vehicle 13B according to the third embodiment is provided in the lower portion 103 of the door trim 102.

Referring to FIG. 8B, the storage structure for vehicle 13B includes a recess 22B formed in the lower portion 103 of the door trim 102, and a storage body 30B having a substantially block shape, which is storable in the recess 22B.

The recess 22B is a block-shaped space which is open toward the left side (inward in the vehicle width direction) and of which the longitudinal direction becomes the vehicle front-rear direction. The recess 22B includes a bottom portion 23B facing upward; a back wall 24B extending upward from a back edge (right edge) of the bottom portion 23B; a pair of lateral walls 25B and 26B extending upward from both edges in the vehicle front-rear direction of the bottom portion 23B; and a top plate portion 27B facing the bottom portion 23B. Incidentally, the position where the recess 22B is formed is not limited to being toward a front of the lower portion 103 of the door trim 102, and the recess 22B may be formed in any position in the door trim 102. Further, the door trim 102 can be employed for a door for vehicle as appropriate.

The basic configuration of the storage body 30B is the same as that of the storage body 30. Namely, the storage body 30B includes a box 40B and a shutter 50B.

The storage body 30B is swingably attached to the lateral walls 25B and 26B of the recess 22B. The storage body 30B in the storage position is swingable inward in the vehicle width direction. An axis AX1 which is the center of swing extends in the vehicle front-rear direction. A direction in which the axis AX1 extends is the longitudinal direction of the storage body 30B.

Fourth Embodiment

FIG. 9A illustrates a rear-row seat 110 provided behind the driver's seat and the passenger's seat. The rear-row seat 110 is not limited to a second row immediately behind the driver's seat and the passenger's seat, and may be a seat in a third row or beyond. A plurality (for example, two) of occupants are seatable side by side in the vehicle width direction in the rear-row seat 110.

The rear-row seat 110 includes a first seat 111 and a second seat 112 arranged in the vehicle width direction, but may further include a seat adjacent to the first seat 111 or the second seat. A first backrest portion 111a of the first seat 111 and a second backrest portion 112a of the second seat 112 are arranged in the vehicle width direction. An intermediate portion 113 is provided between the first backrest portion 111a and the second backrest portion 112a.

It can also be said that the intermediate portion 113 is a portion that fills a space between the first backrest portion 111a and the second backrest portion 112a. The first backrest portion 111a, the second backrest portion 112a, and the intermediate portion 113 may be separate from each other or may be integrated.

A front surface 113a of the intermediate portion 113 is located on substantially the same plane as the first backrest portion 111a and the second backrest portion 112a. A storage structure for vehicle 13C according to the fourth embodiment is provided in the front surface 113a of the intermediate portion 113.

Referring to FIG. 9B, the storage structure for vehicle 13C includes a recess 22C formed in the front surface 113a of the intermediate portion 113, and a storage body 30C having a substantially block shape, which is storable in the recess 22C.

The recess 22C is a block-shaped space which is open toward the front and of which the longitudinal direction becomes the vehicle height direction (up-down direction). The recess 22C includes a bottom portion 23C facing upward; a back wall 24C extending upward from a back edge of the bottom portion 23C; a pair of lateral walls 25C and 26C extending upward from both edges in the vehicle width direction of the bottom portion 23C; and a top plate portion 27C facing the bottom portion 23C.

The basic configuration of the storage body 30C is the same as that of the storage body 30. Namely, the storage body 30C includes a box 40C and a shutter 50C. The storage body 30C is swingably attached to the lateral walls 25C and 26C of the recess 22C. The storage body 30C in the storage position is swingable toward the front.

Incidentally, the invention is not limited to the embodiments as long as the actions and the effects of the invention are achieved.

What is claimed is:

1. A storage structure in a vehicle comprising:
   a storage body that is storable in a recess in a passenger compartment,
   wherein the storage body includes a box that is open on one surface, and an opening and closing member by which the open surface of the box is openable and closable,
   the box has an extraction hole through which an object stored in the box is extractable, and the extraction hole is located in a surface different from the open surface of the box,
   the storage body is swingably attached to the recess, so that the storage body is allowed to be in a storage position where the storage body is stored in the recess and in a swing position that is a position where the storage body is swung from the storage position,
   when the storage body is in the storage position, the opening and closing member faces the passenger compartment, and
   when the storage body is in the swing position, the opening and closing member and the extraction hole face the passenger compartment.

2. The storage structure in a vehicle according to claim 1, wherein the storage body in the storage position is swingable upward.

3. The storage structure in a vehicle according to claim 1, wherein the storage body is located at substantially a center in a vehicle width direction.

4. The storage structure in a vehicle according to claim 1, further comprising:
   a holding mechanism by which the storage body in the swing position is heldable.

5. The storage structure in a vehicle according to claim 1, wherein the swing position includes a horizontal position where the opening and closing member becomes substantially horizontal.

6. The storage structure in a vehicle according to claim 1, wherein the opening and closing member is a shutter, and a direction from top to bottom with respect to when the storage body is in the storage position is a direction in which the shutter is closed.

7. The storage structure in a vehicle according to claim 2, wherein the extraction hole is located opposite the opening and closing member, and the box is formed to fit an external shape of a tissue box.

8. The storage structure in a vehicle according to claim 3, wherein the extraction hole is located opposite the opening and closing member, and the box is formed to fit an external shape of a tissue box.

9. The storage structure in a vehicle according to claim 4, wherein the extraction hole is located opposite the opening and closing member, and the box is formed to fit an external shape of a tissue box.

10. The storage structure in a vehicle according to claim 5,
   wherein the extraction hole is located opposite the opening and closing member, and the box is formed to fit an external shape of a tissue box.

11. The storage structure in a vehicle according to claim 6,
   wherein the extraction hole is located opposite the opening and closing member, and the box is formed to fit an external shape of a tissue box.

12. The storage structure in a vehicle according to claim 7, further comprising:
   a plate-shaped member by which the extraction hole is closable is provided,
   wherein the plate-shaped member is attachable and detachable from the extraction hole.

13. The storage structure in a vehicle according to claim 1,
   wherein the recess is formed in an instrument panel.

14. The storage structure in a vehicle according to claim 1,
   wherein the recess is formed in a rear surface of a center console.

15. The storage structure in a vehicle according to claim 1,
   wherein the recess is formed in a door trim.

16. The storage structure in a vehicle according to claim 1,
   wherein a rear-row seat in which a plurality of occupants are seatable side by side in a vehicle width direction is provided behind a driver's seat and a passenger's seat,
   the rear-row seat includes a first backrest portion and a second backrest portion arranged in the vehicle width direction, and an intermediate portion located between the first backrest portion and the second backrest portion, and
   the recess is formed in a front surface of the intermediate portion.

* * * * *